UNITED STATES PATENT OFFICE.

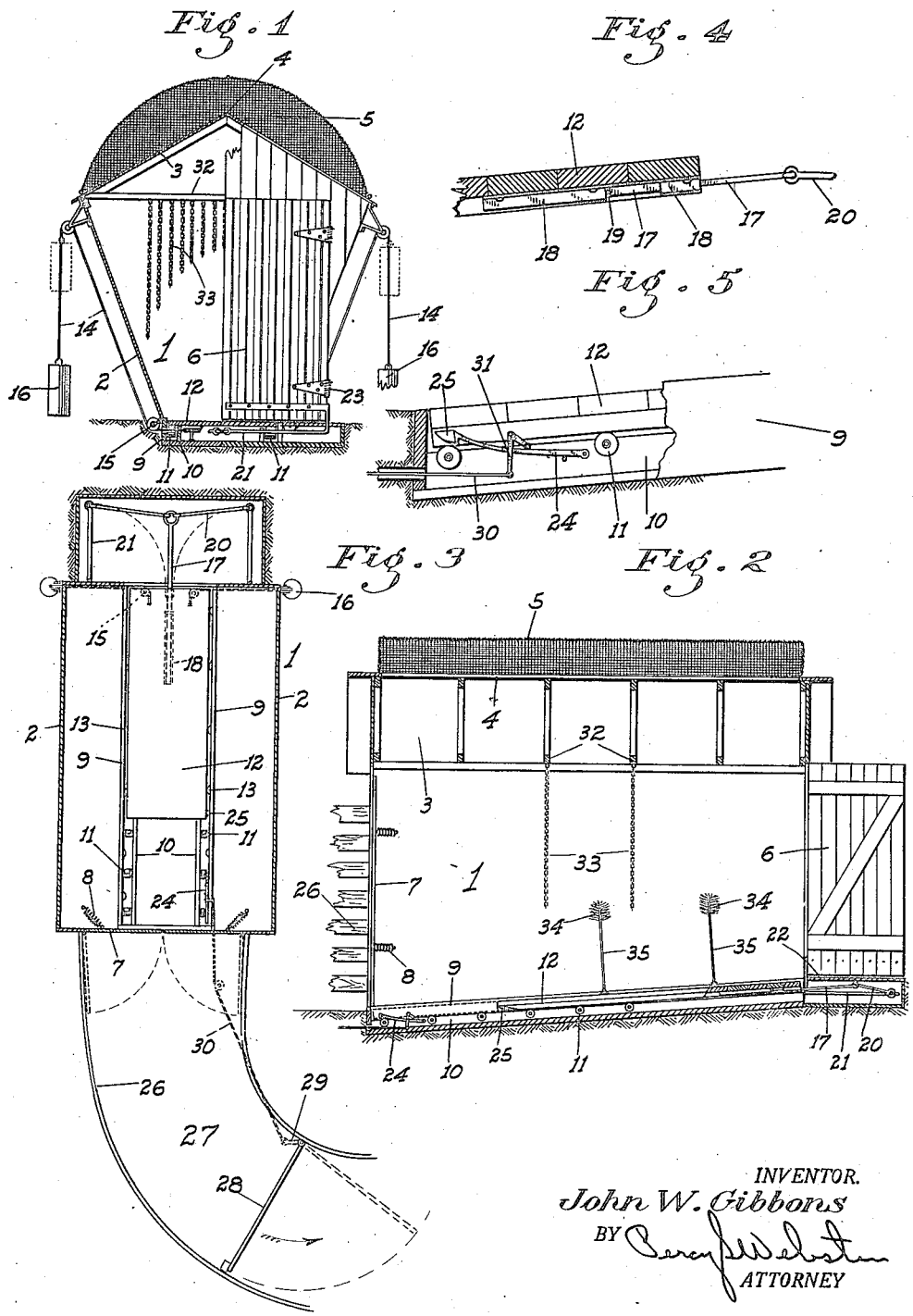

JOHN W. GIBBONS, OF MERCED FALLS, CALIFORNIA, ASSIGNOR OF ONE-HALF TO TIMOTHY CARLON, OF LA GRANGE, CALIFORNIA.

FLYTRAP FOR USE WITH LIVE STOCK.

1,427,204.	Specification of Letters Patent.	Patented Aug. 29, 1922.

Application filed November 5, 1920. Serial No. 421,357.

*To all whom it may concern:*

Be it known that I, JOHN W. GIBBONS, a citizen of the United States, residing at Merced Falls, county of Merced, State of California, have invented certain new and useful Improvements in Flytraps for Use with Live Stock; and I do declare the following to be a full, clear, and exact description of the same, reference being had to the accompanying drawings, and to the characters of reference marked thereon, which form a part of this application.

This invention relates to improvements in traps for flies and other winged insects, which traps in their construction take advantage of the well known fact that flies and similar insects always seek the light and fly upwardly.

The principal object of my invention is to provide a fly trap of an enlarged character, built in the form of a shed through which the live stock are intended to pass, the shed being provided with means for disturbing the flies on the animals and causing them to fly about and finally to enter the trap proper, from which there is no escape.

Another object is to provide doors or openings at each end of the shed which will be automatically opened and closed by the passage of the animal therethrough, the shed and doors being opaque and the only daylight normally visible being through a narrow slit at the top of the shed, to which the insects will instinctively fly to the trap above, instead of out through the doorways, as undoubtedly a good many would escape in this manner were the doorways left as permanent openings.

Insects, and particularly flies, are a constant source of annoyance to livestock, especially cattle, the pests of course being more prevalent in some localities than in others. In order to relieve themselves, the cattle rub against anything which will tend to brush the pests from their backs, such as fruit trees, thorny berry vines and the like. This not only results in the animal's skin being scratched, tending to cause sores, and sometimes in the breaking down of the trees or vines; but the relief gained is at best only very temporary, since the flies are not destroyed nor even caught, but merely disturbed for the time being.

My device however, will not only disturb the flies, but will catch the majority if not all of them, when they may be destroyed at leisure.

The device is intended to be installed in any suitable location as a permanent piece of equipment, through which the cattle may be driven at stated intervals or whenever the necessity demands. It is also highly probable, that once the animals discover that their irritating pests are removed by passing through the shed, they will voluntarily use the same when again annoyed, if the trap is placed where the animals may have easy access thereto.

These objects I accomplish by means of such structure and relative arrangement of parts as will fully appear by a perusal of the following specification and claims.

In the drawings similar characters of reference indicate corresponding parts in the several views.

Fig. 1 is an end elevation of the device, half in section.

Fig. 2 is a longitudinal section thereof.

Fig. 3 is a ground plan of the same.

Fig. 4 is an enlarged fragmentary view of one end of a movable platform showing a door actuating mechanism connected thereto.

Fig. 5 is a similar view at the other end of the platform, showing a catch means.

Referring now more particularly to the characters of reference on the drawings, the numeral 1 denotes a shed of sufficient height and width to accommodate the animal for which it is intended, and having a length about equal to double the length of such animal.

The sides 2 of the shed are made of boards, sheet iron or other opaque material, and preferably slope outwardly from the bottom up. The roof 3 is also opaque, and slopes upwardly from the edges to a central longitudinal peak, at the apex of which a narrow slit 4 is left, of sufficient width to permit a fly or similar insect to readily pass therethrough. Above the roof and spaced therefrom is a cover or hood 5 of wire screening, forming an enclosed area into which the only normal opening is through the slit 4. This hood may be removably fastened or hinged to the roof so that it may be raised or removed to clean out the flies, after the latter have been killed in any desired manner.

Front end doors 6 and rear end doors 7 are provided, these doors being each a pair abutting along a vertical central line and being hinged to the sides.

The rear end doors are normally held closed by means of suitable springs 8, of sufficient strength to merely close the doors promptly after the passage of the animal therethrough.

The front end doors however are opened and closed automatically by means hereinafter described.

Extending lengthwise of the shed on each side thereof and resting on the ground or on a suitable foundation are outer beams 9 and inner beams 10 spaced from the former and of considerably lesser height than the same, these beams having a downward slope from the front to rear end. Journaled between each pair of beams and projecting above the innermost ones are rollers 11 on which rides a platform 12, which extends over the inner beams 10 but terminates inside the outer beams, there being rollers 13 journaled in the latter and projecting from the inner faces thereof to bear against the edges of the platform so that the latter may have practically frictionless travel.

This platform does not extend the full length of the shed, but is sufficiently shorter to permit of a certain and predetermined amount of travel.

On account of the downward slope of the supporting beams, the platform if left free would naturally move to the lower and rear end of the shed. In order to normally prevent this however, cables 14 are attached thereto adjacent the forward end, which cables extend over suitable directing-pulleys 15 to counter-balancing weights 16.

To control the movement of the doors 6 by the movement of the platform, a rod or bar 17, is slidably mounted under the platform at the forward end in a pair of longitudinally spaced sleeves 18. Projecting from the bar is a pin 19 adapted to bear against either sleeve, this pin, when the platform is at the upper end of the shed, bearing against the rear sleeve.

From the outer end of the bar 17, links 20 extend to arms 21 extending parallel to the doors 6 connected thereto, but preferably positioned under the entrance apron or flooring 22.

Thus it will be seen that the opening or closing of the door is dependent on the movement of the platform. At the same time, the sleeve and pin connection of the door actuating bar prevents the door from being closed until the platform has moved a certain distance from the forward end, thus allowing the same time to gain a certain momentum before the work of closing the door is thrown upon it. This is necessary, since besides the opening of the doors by reason of the link and bar mechanism, springs 23 are provided to normally hold the doors open, these springs being preferably of the kind employed on porch screen-doors, but reversed in their action.

Fixed to one of the beams 9 at the rear end of the shed is a spring catch 24 arranged to engage a lug 25 projecting from the side of the platform at its lower end, so as to hold the latter at the rear end of the shed, its tendency being to move to the front end on account of the pull of the weights 16.

Beyond the shed at its rear end parallel fences 26 on each side of the doors 7 enclose a passageway 27 across which is a spring swing gate 28, normally closed, and opening away from the shed, being pivoted or hinged to that fence on the side of the shed on which is the latch 24.

A short arm 29 projects from the pivotal connection of the gate, from which a wire or other connection 30 extends to a catch-trip member 31 positioned and arranged to depress the catch 24 and disengage the same from the lug 25 when the gate 28 is opened.

From the rafters 32 of the shed transverse curtains 33 of light chain or other flexible construction depend, these being arranged to sweep the backs of the animal passing through the shed to disturb and brush off the flies settled on the back.

On the platform 12 are upstanding brushes 34 adapted to sweep the belly of the animal, the stems or shanks 35 of these brushes being of a flexible and spring construction, so that if the animal should step on one of the same, it will immediately spring back to its normal position when the pressure is removed.

In operation, the platform 12 is at the forward end of the shed, the doors 6 are open and the doors 7 closed.

When the platform is in this position and unoccupied, the forward end rests on the inner beams 10 and not on the rollers, since the first of the latter are purposely positioned a short distance back of the center of length of the platform, so that the latter tilts forward, resting more firmly and making a more secure feeling structure than could otherwise be obtained.

The animal then enters the shed and stands on the platform. As soon as this is done, the additional weight causes the platform to move toward the rear end, the doors 6 being closed almost instantly. At the same time, the curtains and brushes sweep across the back and belly of the animal, disturbing the flies, who naturally fly toward the only source of light—the roof—slit 4. Passing therethrough, they are of course trapped, it being instinctive with flies to try to escape only in an upward direction.

On arriving at the lower or rear end of the shed, the platform stops, but the momentum, suddenly arrested, will tend to cause the animal to continue its forward movement, which will immediately start the opening of the doors 7.

Seeing daylight therethrough, the animal will push open the doors and walk from the shed into the passageway 27. To reach freedom, the gate 28 must be passed, the opening of which releases the catch 24 and allows the platform to move to the front end of the shed, the doors 6 being again opened by this movement, and the device is then ready for the admission of another animal.

It is possible that until trained, the animals will have to be driven through the shed, but I believe that as soon as their instinct tells them that no harm but benefit comes to them, they will voluntarily use the device as a fly remover whenever they are irritated by the pests.

From the foregoing description it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A fly trap for live stock comprising a shed through which the stock passes, a fly-trapping enclosure on top of the shed arranged to receive the flies from the shed therein, doors at the entrance end of the shed normally open to allow the stock to pass into the shed, a platform in the shed onto which the animal steps and arranged to move automatically from the entrance to the exit end of the shed with the weight of the animal thereon, and means actuated by the movement of the platform for automatically closing said doors.

2. A fly trap for live stock comprising a shed through which the stock passes, a fly-trapping enclosure on top of the shed arranged to receive the flies from the shed therein, doors at the entrance end of the shed normally open to allow the stock to pass into the shed, a platform in the shed onto which the animal steps and arranged to move automatically from the entrance to the exit end of the shed with the weight of the animal thereon, and means actuated by the movement of the platform for automatically closing said doors and means whereby the platform will move to the entrance end of the shed and the doors will be reopened after the animal has left the shed.

3. A fly trap for live stock comprising a shed through which the stock passes, a fly-trapping enclosure on top of the shed arranged to receive the flies from the shed therein, doors at the entrance end of the shed normally open to allow the stock to pass into the shed, a platform in the shed onto which the naimal steps, a runway sloping down to the exit end of the shed and on which the platform rides, counterbalance means for normally keeping the platform at the entrance end of the shed, the weight of the animal on the platform overcoming the counterbalance and causing the platform to move to the lower and exit end of the shed, and means for holding the platform at the lower end until after the animal has emerged from the shed.

4. A fly trap for live stock comprising a shed through which the stock passes, a fly-trapping enclosure on top of the shed arranged to receive the flies from the shed therein, doors at the entrance end of the shed normally open to allow the stock to pass into the shed, a platform in the shed onto which the animal steps, a runway sloping down to the exit end of the shed and on which the platform rides, counterbalance means for normally keeping the platform at the entrance end of the shed, the weight of the animal on the platform overcoming the counterbalance and causing the platform to move to the lower and exit end of the shed, means for holding the platform at the lower and exit end of the shed, and means actuated by the animal after emerging from the shed for releasing such holding means, whereby the platform will automatically return to the upper and entrance end of the shed.

In testimony whereof I affix my signature.
JOHN W. GIBBONS.